United States Patent
Hitomi et al.

(10) Patent No.: US 10,225,352 B2
(45) Date of Patent: Mar. 5, 2019

(54) WORK SESSIONS

(71) Applicants: SONY CORPORATION, Tokyo (JP);
SONY MEDIA CLOUD SERVICES LLC, Culver City, CA (US)

(72) Inventors: Daniel Hitomi, Culver City, CA (US);
Michael Faulconer, Culver City, CA (US)

(73) Assignees: SONY CORPORATION, Tokyo (JP);
SONY MEDIA CLOUD SERVICES LLC, Culver City, CA (US)

( * ) Notice: Subject to any disclaimer, the term of this patent is extended or adjusted under 35 U.S.C. 154(b) by 207 days.

(21) Appl. No.: 14/577,796

(22) Filed: Dec. 19, 2014

(65) Prior Publication Data

US 2015/0180983 A1 Jun. 25, 2015

Related U.S. Application Data

(60) Provisional application No. 61/919,410, filed on Dec. 20, 2013.

(51) Int. Cl.
*H04L 29/08* (2006.01)
*H04L 29/06* (2006.01)

(52) U.S. Cl.
CPC .......... *H04L 67/141* (2013.01); *H04L 67/306* (2013.01); *H04L 67/42* (2013.01)

(58) Field of Classification Search
CPC ...... H04L 67/141; H04L 67/306; H04L 67/42
See application file for complete search history.

(56) References Cited

U.S. PATENT DOCUMENTS

| | | | | |
|---|---|---|---|---|
| 6,370,573 B1* | 4/2002 | Bowman-Amuah | ..... | G06F 8/20 709/223 |
| 7,406,525 B2* | 7/2008 | Higgins | ................. | H04L 29/06 709/223 |
| 7,908,380 B1* | 3/2011 | Chu | .................... | H04L 12/6418 709/222 |
| 8,819,617 B1* | 8/2014 | Koenig | ..................... | G06F 8/70 717/101 |
| 2002/0065912 A1* | 5/2002 | Catchpole | ......... | G06F 17/30873 709/224 |
| 2003/0131342 A1* | 7/2003 | Bates | ....................... | G06F 8/71 717/125 |
| 2005/0015601 A1* | 1/2005 | Tabi | .................... | G06F 21/6227 713/182 |
| 2006/0294106 A1* | 12/2006 | Frieden | ............. | G06F 17/30873 |
| 2007/0180449 A1* | 8/2007 | Croft | ..................... | G06F 3/1415 718/1 |
| 2007/0283321 A1* | 12/2007 | Hegde | ...................... | G06F 8/71 717/110 |

(Continued)

*Primary Examiner* — Philip J Chea
*Assistant Examiner* — Wuji Chen
(74) *Attorney, Agent, or Firm* — Procopio, Cory, Hargreaves & Savitch LLP

(57) ABSTRACT

Managing data, including: receiving a request to create a work session; creating a work session table stored on a session server, wherein the work session table includes a user table, a data table, and an application table; receiving a request to add a user to the work session; storing user data for the user in a record in the user table of the work session table; receiving a request to add an application to the work session; and storing application data for the application in a record in the application table of the work session table. Key words include work session and data access.

15 Claims, 4 Drawing Sheets

(56) References Cited

U.S. PATENT DOCUMENTS

| | | | | |
|---|---|---|---|---|
| 2008/0005235 A1* | 1/2008 | Hegde | G06Q 10/10 | 709/204 |
| 2008/0109790 A1* | 5/2008 | Farnham | G06F 8/71 | 717/128 |
| 2008/0120599 A1* | 5/2008 | I'Anson | H04L 41/5054 | 717/120 |
| 2008/0155104 A1* | 6/2008 | Quinn | H04L 12/1827 | 709/227 |
| 2008/0178154 A1* | 7/2008 | Basler | G06F 8/20 | 717/124 |
| 2009/0037452 A1* | 2/2009 | Baitalmal | G06F 17/30575 | |
| 2009/0132579 A1* | 5/2009 | Kwang | H04L 67/22 | |
| 2009/0276771 A1* | 11/2009 | Nickolov | G06F 9/4856 | 717/177 |
| 2010/0262925 A1* | 10/2010 | Liu | G06Q 10/10 | 715/759 |
| 2010/0281458 A1* | 11/2010 | Paladino | G06F 8/71 | 717/106 |
| 2010/0306676 A1* | 12/2010 | Srinivasaraghavan | G06Q 10/10 | 715/758 |
| 2011/0173235 A1* | 7/2011 | Aman | A63B 24/0021 | 707/792 |
| 2011/0191746 A1* | 8/2011 | Packbier | G06F 9/44 | 717/103 |
| 2011/0252093 A1* | 10/2011 | Spataro | G06F 17/30011 | 709/204 |
| 2012/0246170 A1* | 9/2012 | Iantorno | G06F 11/3672 | 707/748 |
| 2012/0311522 A1* | 12/2012 | Perisic | G06F 8/71 | 717/102 |
| 2013/0014023 A1* | 1/2013 | Lee | G06Q 10/103 | 715/751 |
| 2013/0091205 A1* | 4/2013 | Kotler | H04L 65/4015 | 709/204 |
| 2014/0351574 A1* | 11/2014 | Grab | G06F 21/10 | 713/155 |
| 2015/0007055 A1* | 1/2015 | Lemus | G06F 3/0484 | 715/753 |
| 2015/0149929 A1* | 5/2015 | Shepherd | H04L 65/403 | 715/753 |
| 2016/0070777 A1* | 3/2016 | Lubeck | G06F 17/30867 | 707/740 |

* cited by examiner

WORK SESSIONS

CROSS-REFERENCE TO RELATED APPLICATIONS

This application claims the benefit of priority under 35 U.S.C. § 119(e) of co-pending U.S. Provisional Patent Application No. 61/919,410, filed Dec. 20, 2013, entitled "Work Sessions". The disclosure of the above-referenced application is incorporated herein by reference.

BACKGROUND

Field of the Invention

The present invention relates to data access, and more specifically, to accessing data in a network environment.

Background

When most applications were only locally hosted (i.e., installed on a personal computer or workstation), developing work and content was done by uploading a ready-for-review/feedback version from a local workstation or personal computer, and uploading it to a shared host. The audience providing review/feedback would download the file and provide feedback and re-upload the updated file (with, for example, the reviewer's summary of comments) until the cycle of feedback/review was completed. Similarly, circulating a file by email is another typical mechanism for sharing and review. However, the above-described conventional model of developing work and content is very cumbersome and not productive.

SUMMARY

The present invention provides for apparatus and methods to implement a technique for providing access to data in a network environment.

In one implementation, a method for managing data is disclosed. The method includes: receiving a request to create a work session; creating a work session table stored on a session server, wherein the work session table includes a user table, a data table, and an application table; receiving a request to add a user to the work session; storing user data for the user in a record in the user table of the work session table; receiving a request to add an application to the work session; and storing application data for the application in a record in the application table of the work session table.

In another implementation, an apparatus for managing data is disclosed. The apparatus includes: means for receiving a request to create a work session; means for creating a work session table stored on a session server, wherein the work session table includes a user table, a data table, and an application table; means for receiving a request to add a user to the work session; means for storing user data for the user in a record in the user table of the work session table; means for receiving a request to add an application to the work session; and means for storing application data for the application in a record in the application table of the work session table.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Figure 1:
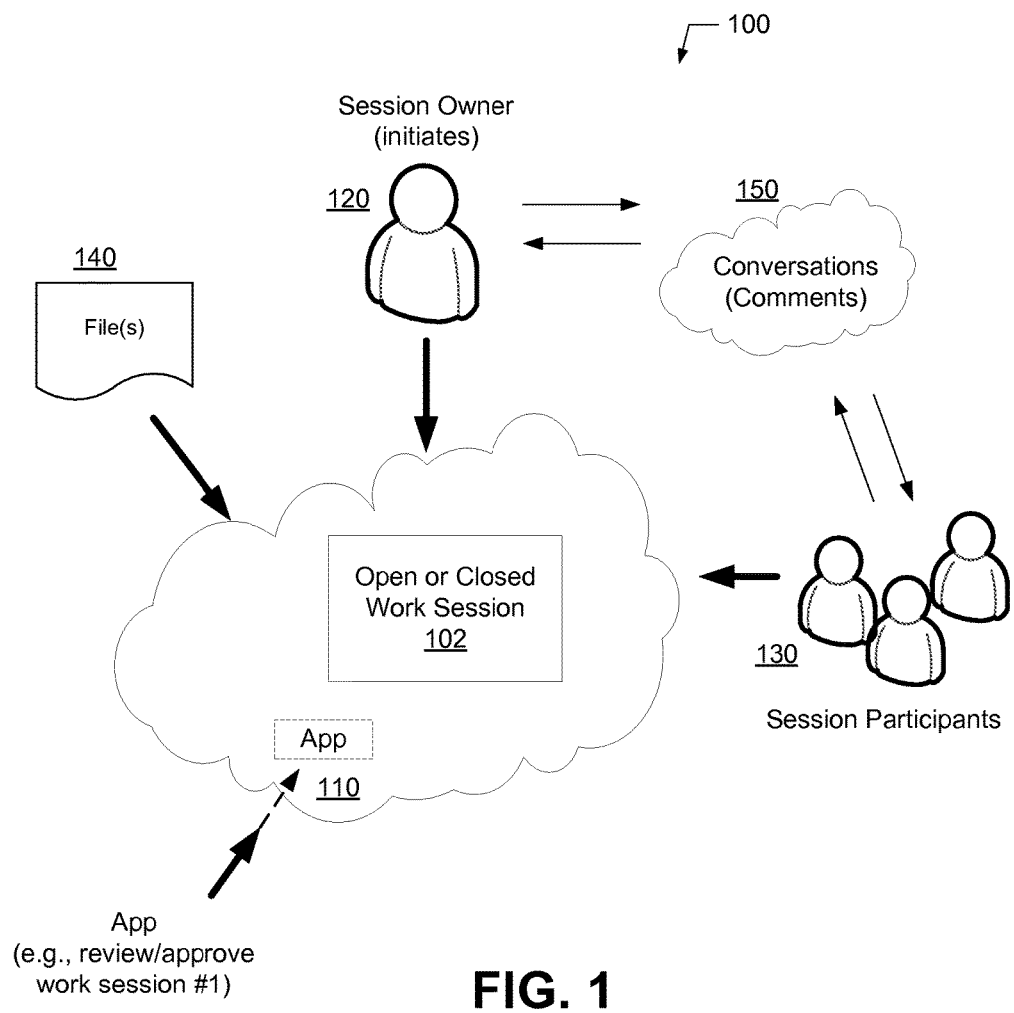
FIG. 1 is a functional diagram illustrating a session system which uses at least one work session to support the above-described functions in accordance with one implementation of the present disclosure.

With the trend towards cloud-based applications and file hosting, the problems with the conventional model of developing work and content are now being addressed. One approach has been to develop standards such as an authorization specification to facilitate system-to-system data exchange of user data. Other approaches have largely addressed the problems by making data accessible, searchable and linkable (e.g., between an application and file host). However, while addressing some technical aspects, these approaches have not provided a good solution for how to manage a user interface (UI) and experience (UX) well, such as how to inform a user if, where, what and how file(s) are being used, especially from a file host, owner and/or seeker perspective.

The emergence of cloud-based (hosted) applications enables open and common data access, sharing and exchange which drive real-time or near real-time collaboration use-cases. The mass acceptance and adoption of cloud-based software has created a fragmented market with many cloud-based software service providers vying to be the host (system of record) for their users' data (files) to execute a "platform" strategy. As the cloud market evolves, users may desire to keep file storage and access de-coupled from applications to preserve flexibility and prevent application lock-in. That is, to keep their options open for trying and using the best and newest application.

To keep their cloud file storage de-coupled from the applications used to support their workflow, the users need to find a way to grant temporary access to the file(s) with a third party application. In "user sharing" models, a user grants another user temporary access to content (for viewing or download). Instead, "system sharing" can provide access to a system, where a user grants another system temporary access to content (for use within the application). From a UX perspective, file owners or file seekers will likely prefer an easy and intuitive way to understand if a file is being worked on or ready to use by another person or system. Implementations of a session system can use session management to provide one or more of these features. Features provided in implementations can include, but are not limited to, one or more of the following items: (1) Providing access to data to multiple computer system; (2) Providing access to data to multiple computer applications (e.g., software programs); (3) Providing a record of activity related to data; and (4) Providing a record of charges and payments for data access and application use.

Certain implementations as disclosed herein provide for a session system which performs several operations for work sessions. In one implementation, a work session is created by the session system as a common container and area for temporary and purposeful collaboration among an application, files, and people. In another implementation, the session system invites file(s) to the work session. In another implementation, the session system invites internal and external participants to the work session. In another implementation, the session system invites an application to the work session. In another implementation, the session system stores and hosts external file(s). In another implementation, the session system collects and preserves user and system activity within the work session (i.e., bounded activity stream). After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

In one implementation, the session system provides a common awareness and context to not only people actively participating (inner awareness) in the work session, but also the people who are not actively participating (outer awareness) for the work occurring against file(s). In another implementation, the session system also extends access to file(s) to other people and other applications beyond the normal security and control definitions for the workgroup without exposing all files of the workspace of teams or users. For example, the session system allows a vendor to view and access file(s) without viewing all files available to the project team or user. In another implementation, the session system collects contextual and temporal data to enable future recall, rebuilding of work context (how it was made and improved), preservation and auditing of activities around a file throughout the files' creation-to-distribution lifecycle. For example, the collected data shows how a file was used and evolved throughout its lifecycle and informs a file seeker if file is ready to use. In another implementation, the session system manages collaborative workflows where the file(s) are shared across different third Party applications (i.e., auto-create and linking of work sessions).

FIG. 1 is a functional diagram illustrating a session system 100 which uses at least one work session 102 to support the above-described functions in accordance with one implementation of the present disclosure. The work session 102 acts as a common access point for applications, users, and data. Thus, the work session 102 can be used to track and preserve file(s) 140, application(s) 110, and people 120, 130, while providing authenticated and authorized services to enable access to file(s) and publish back and/or collect work activity. In one implementation, a work session 102 is used to coordinate and track collaborative activity related to a task or phase in a workflow, such as video or audio editing in movie production, and so each work session 102 typically has one application 110 that acts as the focus of the session 102. The work sessions 102 can act as neutral locations between files 140, session owner 120, session participants 130, and applications 110. Instead of separated files each proprietary to its own application with different respective access controls, the work session 102 can provide a space for the files 140 and application 110 to come together for common reference and access by the people 120, 130.

In the illustrated implementation of FIG. 1, the session system 100 supports creating a work session 102 as a common container and area for temporary and purposeful collaboration an application 110, file(s) 140, and people 120, 130. To do this, the session system 100 invites file(s) 140, internal and external participants 120, 130, and an application 110 to the work session 102. The arriving external file(s) 140 are stored, and user and system activities are collected and preserved within the work session 102 (i.e., bounded activity stream). Further, conversations and/or comments 150 can be exchanged between the session owner 120 and the session participants 130 outside of the work session 102.

Figure 2:
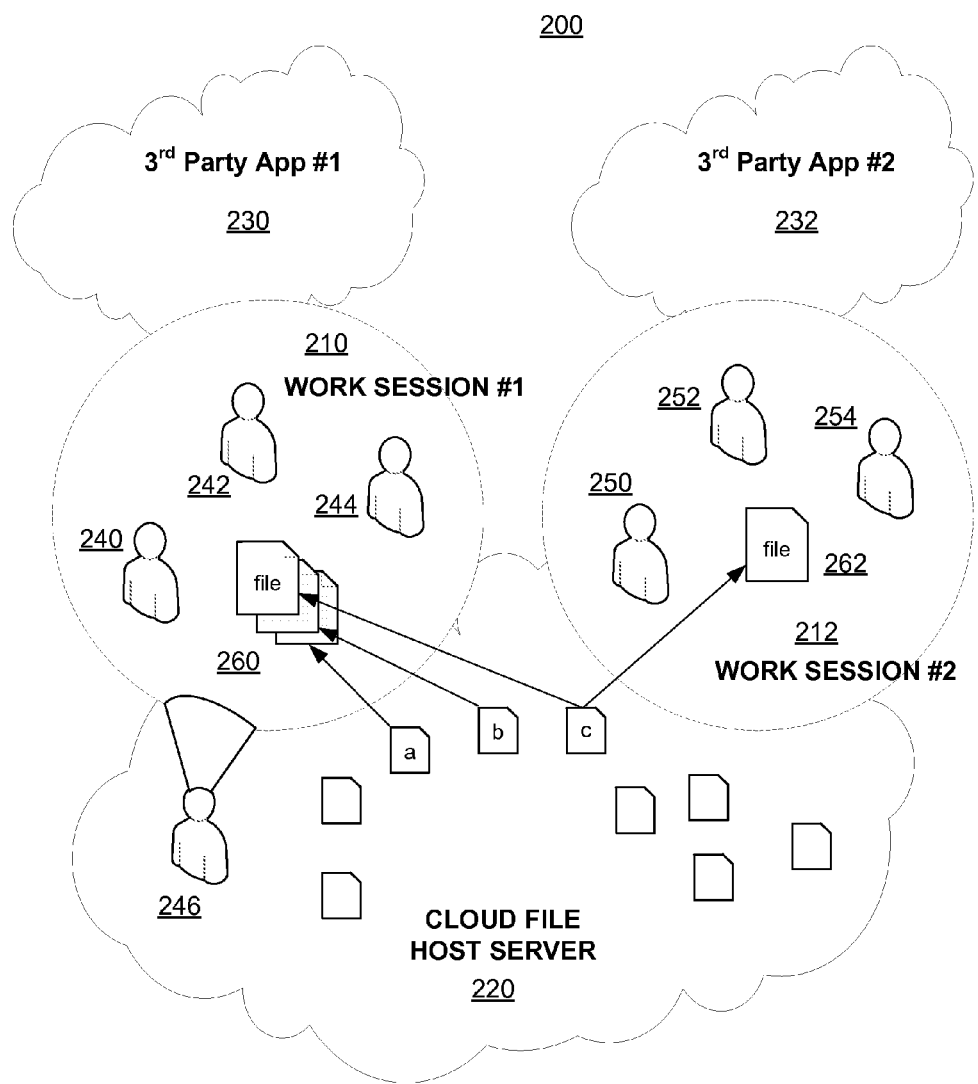
FIG. 2 is a functional diagram illustrating a session system which uses at least one work session in accordance with another implementation of the present disclosure.

FIG. 2 is a functional diagram illustrating a session system 200 which uses at least one work session 210, 212 in accordance with another implementation of the present disclosure. In the illustrated implementation of FIG. 2, the session system 200 is a network server 220 (computer system) providing a cloud-based service for work sessions 210, 212. A work session 210, 212 is represented by a collection of records (e.g., in one or more data tables) storing data indicating which user(s) 240, 242, 244, 246, 250, 252, 254, files(s) 260, 262, and application(s) 230, 232 are part of or connected to the work session 210, 212.

In an example of operation, a user 246 connects the user computer to the session system 200 over the Internet (or other network). The session system 200 presents existing work session(s) 210 to the user 246 and provides an option to request a new work session 212. Some work sessions are open and the user can join or view one of these existing work sessions. Some work sessions can be closed, and a user cannot join without an invitation or approval. If the user 246 requests a new work session, the session system 200 creates a new work session and supporting data (e.g., allocating storage space, creating data tables and a work session identifier). The user 246 that creates the session 210 is the session owner and has control over the work session 210, such as how people and data are added or removed from the session and how data may be accessed and modified. For example, in one work session 210 only the session owner 246 may invite users 240, 242, 244 while in another work session 212 any user 250, 252, 254 may invite additional users. The session owner also controls when the work session is closed and removed.

The session system 200 also creates or opens a session log (data file). The session log for a work session preserves information indicating the activity related to the work session (e.g., as event, object, time), such as adding, accessing, changing, removing a file, person, application, or resource. This information reflects the session history and activity stream within the work session over time. The log is preserved during and after the close or completion of a work session, such as for later review in other work sessions, generating session and progress reports, or auditing (quality, payment). The applications operating in a work session also provide information to the session log, for historical information and also for later access by the same application or different compatible applications. The session system 200 maintains the data in the session log for searching as well, such as by building and maintaining indices for the data.

In one implementation, the work session 210 has an active application 230 or tool (e.g., a video editing tool). This application 230 is the focus of the work session 210. The application 230 may or may not be resident on the same computer system or network as the session system 200, but does have network access to the session system 200. Similarly, some or all of the data storage may be local or remote to the session system 200, the application hosting system, and the user computer system. The session system 200 coordinates requests from the application 230 to access and modify the data and files for the work session 210. Because the application may be operating on a different computer system from where a data file is stored and managed, the application 230 may not have direct access or access permission for a data file. The session system 200 provides the connection between the application 230 and the data 260. For example, the session system 200 can store access permission information for the data file (e.g., in a data table for work session) and provide that permission information to the application 230 as needed. In another implementation, the session system 200 provides a token to the application 230 which authenticates the application 230 when the application requests or accesses the data file. In another implementation, the session system 200 acts as or creates a proxy or intermediary for the application 230 and provides the authorized connection to the data file 260. For example, the session system 200 creates a local copy and moves the data back and forth between the data storage and application server.

Each work session 210, 212 can be configured differently and can also have overlap with other work sessions. A different work session may have a different active application and use the same data that was used in other work sessions (or is being used in other session, e.g., with file and version management). In another implementation, a work session can have multiple active applications that work together or separately on data. For example, in one system, an editing work session has an active video editing tool and an active audio editing tool. Users in the session can use either or both tools to access and edit the data for the work session. In another system, the system establishes two work sessions with respective tools, one for video editing and one for audio editing, and coordinates information between the two work sessions (e.g., sharing session log information and metadata to maintain data integrity and awareness across the sessions).

Users may join and leave work sessions according to the rules of the work sessions (e.g., as set by the system or by the session owner). Similarly, users and applications may add, remove, and modify data and files in the work session (and applications if appropriate) according to the work session rules. The work session is established with a theme or goal, or other process or function as the purpose of the work session so users will generally take actions to support that theme; however, this control may or may not be enforced through rules and technical operation, and may be presented as a guideline of best or preferred practice to participants rather than technical restrictions or framework. When the activity is complete, the session owner can close the work session. (The applications and data are still available to be used in other work sessions.) The opening and closing of the work session and recording of the activity stream in the session log reflect the beginning, progress, and completion of work on a task or project.

In an example of video production, multiple work sessions can be used to manage the flow of operations, concurrently and in sequence. Initially work sessions are created for the raw video capture and review. More work sessions are added for initial image editing, such as computer graphics elements and compositing. Another collection of work sessions are used for audio edits. Then work sessions are used for cutting and combining frame sequences and related review. Finally work sessions can be used for final review and completing the video. After the production is complete, new work session may be created to work on alternate versions (e.g., localization). During the process, users, data, and applications can be involved in multiple work sessions, at the same time or separately. The growing collection of session logs can be used to review the history and progress of activity, and later for auditing, payments, and quality review. These elements are not necessarily all within the same system or network (or company). Users can join work sessions from multiple locations and data can be added from multiple storage sites (without transferring the data to a common location). Similarly, the applications used in the work session are not necessarily all resident or managed by a single provider or location. Each work session can have a different application that may be provided by different services. The work session and virtual space it represents provides the common context for collaboration across the networked users and resources.

In another implementation, the session system allows work sessions to serve as application workspaces (scratch disk) to store app-specific supplemental files (e.g., additional video proxies) or app-specific outputs (e.g., stitched file).

In another implementation, the session system provides monetization of sessions. The session system provides a way to monetize applications or tools in a generic/common way by tracking or charging based on sessions. This model may be a way to create incentive models for third party applications to integrate and provide mutual monetization models (i.e., revenue share based on session utilization). The session system can monitor, control or constrain use by allowing an application to define a number of sessions allowed (per use or concurrent use) for a given price, by tying sessions to a unit of currency (i.e., 5 tokens=1 session of App #1 vs. 10 tokens=1 session of App #2), or by allowing an application to access session log information to determine use over time by different people under access conditions and tie that back to license terms to determine payment due.

In another implementation, the session system creates and tracks relationships among work sessions. For examples, work sessions can have tree or hierarchical relationships (e.g., sessions A and B are child sessions of session C, and session D is a child session of session A). In such a system, the relationships are maintained through information in the session log files. Work sessions can inherit or pull attributes from related sessions, such as session owner or rules on data modification. The session system can create or spawn new work sessions from existing sessions, and also remove or destroy work sessions when they are completed or no longer needed (session log information may still be preserved or merged at that point). In one implementation, the session system can merge or move work sessions among the relationships. In another implementation, a work session can contain one or more additional work sessions. For example, the work session and the additional work sessions added to the work session can form a work session group that can be used to organize and contain one or more work sessions. In this implementation, multiple work session groups can be formed. Thus, each work session group keeps similar work sessions organized and together.

In one implementation, work sessions can provide connections between other work sessions. For example, each application may have its own type of work session defined by the application provider. The session system provides a neutral work session to support access and the exchange of information and files between proprietary work sessions (e.g., all the work sessions follow a common API or other interface mechanism and format requirements, at least for files ready to be shared). This approach allows each application to set its own rules for access and control for users and files in its own work session and still provides a common reference in the session system work sessions for managing tasks and files across those applications.

In another implementation, the session system provides task management in work sessions. Users can add tasks to accomplish in the work session (e.g., "to do" or punch lists). The timing of and progress of the tasks is recorded in the work session data and the session log and presented through the work session UI. Similarly, resource allocation can also be assigned and recorded. In one implementation, the task management is provided by a separate application or service (possibly on another server) that shares data with the work session to track and manage the tasks.

Figure 3A:
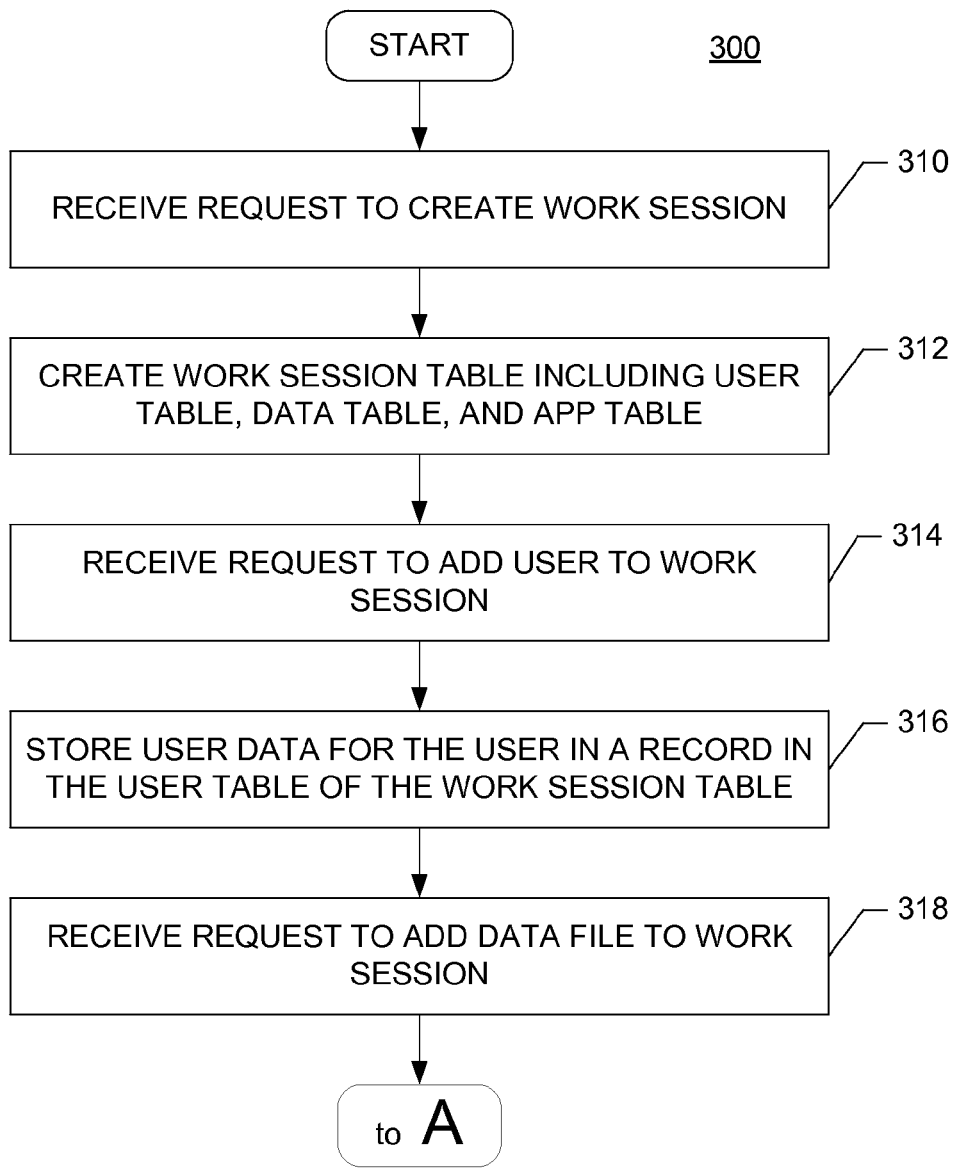
FIGS. 3A and 3B are a functional flow diagram illustrating a method for managing data in accordance with one implementation of the present disclosure.
Figure 3B:
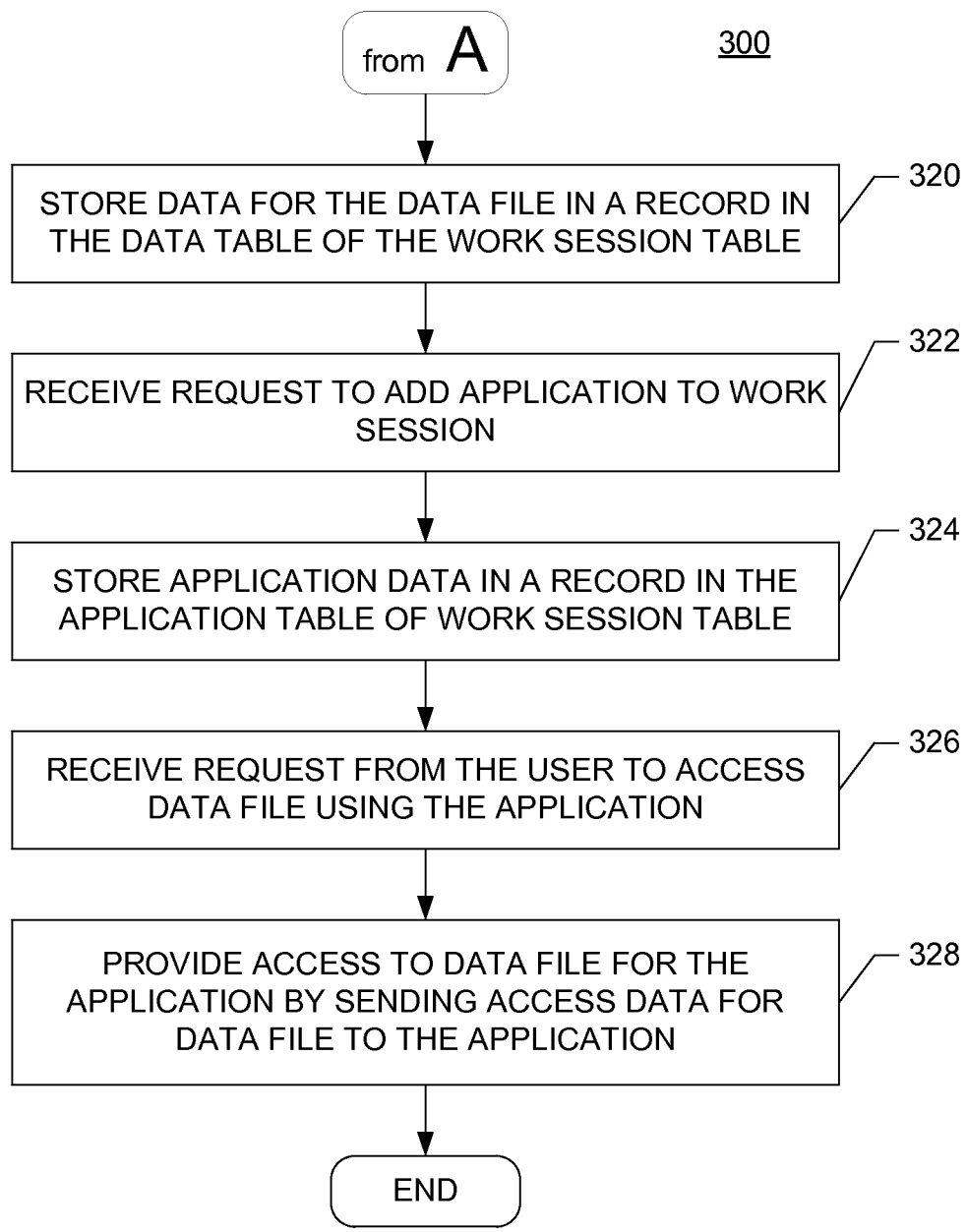

FIGS. 3A and 3B are a functional flow diagram illustrating a method 300 for managing data in accordance with one implementation of the present disclosure. In the illustrated implementation of FIGS. 3A and 3B, the method 300 includes receiving a request to create a work session, at step 310, and creating a work session table stored on a session server, at step 312. In one implementation, the work session table includes a user table, a data table, and an application table. A request to add a user to the work session is then received, at step 314, and the user data for the user in a record in the user table of the work session table is stored, at step 316. Next, a request to add a data file to the work session is received, at step 318, and file data for the data file in a record in the data table of the work session table is stored, at step 320. In one implementation, the file data includes access data for the data file. A request to add an application to the work session is then received, at step 322, and the application data for the application in a record in the application table of the work session table is stored, at step 324. A request from the user to access the data file using the application is then received, at step 326, and access to the data file for the application is provided, at step 328, by sending the access data for the data file to the application.

One implementation includes one or more programmable processors and corresponding computer system components to store and execute computer instructions, such as to provide the session system supporting coordination of data access and recording of activity.

While several examples above focus on storage and use of video and assets for video production, any file or data storage can be used in this and other implementations.

One example using medical data is a medical asset storage and operations system, storing and using medical records, patient data and images. There may be many users of patient data in the environment, such as a hospital, a doctor, an insurance provider, and a patient. Each of these participants may have different tools to access the same data. The common access permissions and interfaces in a work session system provide the different users access to the data for review, editing, addition, deletion for different purposes and using different tools. This common access allows the users to be free to use their own compatible tools rather than having to adopt a single solution.

In another example, the medical (or other) data can be processed in stages at a cloud system using different tools. In a process that requires several steps, the data processing can be handled as multiple and/or dynamic work sessions using different tools as control is passed from one tool to another and/or operated upon in parallel while the data resides in a central location (cloud). Manual or automated selection of tools and hand-offs can be used. For example, while (or after) data at a cloud location is processed by an image processing tool at one location, sections of the processed image data can be accessed by an analysis tool at another location.

The above description of the disclosed implementations is provided to enable any person skilled in the art to make or use the invention. Various modifications to these implementations will be readily apparent to those skilled in the art, and the generic principles described herein can be applied to other embodiments without departing from the spirit or scope of the invention. For example, instead of or in addition to video production and data, audio data, game assets, marketing data, and other kinds of data are also useful targets of work session management and as data and functions for use session system implementations. Accordingly, the techniques are not limited to the specific examples described above. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for managing data to provide a cloud-based service for a plurality of work sessions, comprising:
   receiving a request to create a work session that is represented by a collection of tables,
   wherein the plurality of work sessions is arranged in multiple hierarchical structures such that each work session of the plurality of work sessions is enabled to inherit or pull attributes from a related session in a same hierarchical structure,
   wherein the attributes inherited or pulled includes session owners or rules on modification;
   creating a work session table stored on a session server, wherein the work session table includes a user table, a data table, and an application table,
   wherein the user table, the data table, and the application table are configured to indicate which users, files, and applications are connected to the work session, respectively;
   receiving a request to add a user to the work session;
   storing user data related to the work session for the user in a record in the user table of the work session table;
   receiving a request to add an application to the work session;
   providing a token to the application, wherein the token is used to authenticate the application when the application requests access to a data file related to the work session in the data table;
   storing application data for the application related to the work session in a record in the application table of the work session table; and
   creating a session log which preserves information indicating an activity related to the work session including adding, accessing, changing, removing a file, person, application, or resource.

2. The method of claim 1, further comprising:
   receiving a request to add the data file to the work session; and
   storing file data for the data file in a record in the data table of the work session table, wherein the file data includes access data for the data file.

3. The method of claim 2, further comprising:
   receiving a request and the token to access the data file using the application; and
   providing access to the data file for the application by sending the access data for the data file to the application when the token for the application is authenticated.

4. The method of claim 2, wherein the data file is stored on a data server that is remote from the session server.

5. The method of claim 1, further comprising
storing data for the session log in a record of the data table of the work session table.

6. The method of claim 1, further comprising
storing data in the session log for each user, data file, and application participating in the work session.

7. The method of claim 1, further comprising
storing data in the session log for each change to each user, data file, and application participating in the work session and how that participation changes.

8. The method of claim 1, further comprising
creating a payment table stored on the session server; and
storing payment data for the work session in a record in the payment table, wherein the payment data indicates the work session, the user, and the application.

9. The method of claim 1, wherein the application is stored on an application server that is remote from the session server.

10. A non-transitory storage medium storing a computer program to manage data using a session server to provide a cloud-based service for a plurality of work sessions, the computer program comprising executable instructions that cause a computer to:
receive a request to create a work session that is represented by a plurality of tables,
wherein the plurality of work sessions is arranged in multiple hierarchical structures such that each work session of the plurality of work sessions is enabled to inherit or pull attributes from a related session in a same hierarchical structure,
wherein the attributes inherited or pulled includes session owners or rules on modification;
create a work session table stored on a session server, wherein the work session table includes a user table, a data table, and an application table,
wherein the user table, the data table, and the application table are configured to indicate which users, files, and applications are connected to the work session, respectively;
receive a request to add a user to the work session;
store user data related to the work session for the user in a record of the user table of the work session table;
receive a request to add an application to the work session;
provide a token to the application, wherein the token is used to authenticate the application when the application requests access to a data file related to the work session in the data table;
store application data for the application related to the work session in a record of the application table of the work session table; and
create a session log which preserves information indicating an activity related to the work session including adding, accessing, changing, removing a file, person, application, or resource.

11. The non-transitory storage medium of claim 10, wherein the data table enables a data file to be added to the work session by storing file data for the data file in a record of the data table, wherein the file data includes access data for the data file.

12. The non-transitory storage medium of claim 11, wherein the data file is stored on a data server that is remote from the session server.

13. The non-transitory storage medium of claim 10, the computer program further comprising executable instructions that cause a computer to
store payment data for the work session in a record of a payment table, wherein the payment data indicates the work session, the user, and the application.

14. The non-transitory storage medium of claim 10, wherein the application is stored on an application server that is remote from the session server.

15. The method of claim 1, further comprising
one of merging or moving related sessions in the same hierarchical structure.

* * * * *